US011821485B1

(12) United States Patent
Nishizawa et al.

(10) Patent No.: US 11,821,485 B1
(45) Date of Patent: Nov. 21, 2023

(54) COIL SPRING

(71) Applicant: NHK SPRING CO., LTD., Yokohama (JP)

(72) Inventors: Shinichi Nishizawa, Walled Lake, MI (US); Takeshi Furuse, Yokohama (JP); Senri Moriyama, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/830,147

(22) Filed: Jun. 1, 2022

(51) Int. Cl.
*F16F 1/04* (2006.01)
*F16F 1/06* (2006.01)
*B60G 11/14* (2006.01)

(52) U.S. Cl.
CPC .............. *F16F 1/043* (2013.01); *F16F 1/06* (2013.01); *B60G 11/14* (2013.01); *B60G 2202/12* (2013.01); *B60G 2206/724* (2013.01); *B60G 2800/162* (2013.01); *F16F 2224/0208* (2013.01); *F16F 2238/026* (2013.01)

(58) Field of Classification Search
CPC ...... F16F 1/043; F16F 1/06; F16F 2224/0208; F16F 2238/026; F16F 2230/0023; B60G 11/14; B60G 2202/12; B60G 2206/724; B60G 2800/162; B60G 2206/42; B60G 2600/44
See application file for complete search history.

(56) References Cited

U.S. PATENT DOCUMENTS

| 231,150 | A | 8/1880 | Cliff |
| 1,963,054 | A | 6/1934 | Powers |
| 2,230,069 | A | 1/1941 | Rushmore |
| 2,605,099 | A | 7/1952 | Brown |

(Continued)

FOREIGN PATENT DOCUMENTS

| CN | 201382112 Y | 1/2010 |
| DE | 19619074 A1 | 11/1997 |

(Continued)

OTHER PUBLICATIONS

Office Action (Non-Final Rejection) dated Feb. 23, 2023, issued in related U.S. Appl. No. 17/703,295.

(Continued)

*Primary Examiner* — Thomas W Irvin
(74) *Attorney, Agent, or Firm* — Holtz, Holtz & Volek PC

(57) ABSTRACT

According to one embodiment, a coil spring includes a wire rod with a first end and a second end. The wire rod includes a round section portion including a round first cross section perpendicular to a longitudinal direction of the wire rod, a quadrangle section portion including a quadrangle a second section perpendicular to the longitudinal direction, and a variable section portion formed between the round section portion and the quadrangle section portion of the wire rod. The cross section of the variable section portion varies from circular to quadrangle from the round section portion to the quadrangle section portion. The end turn part of the coil spring includes the quadrangle section portion. The width (Continued)

and thickness of the second cross-section are smaller than the diameter of the first cross-section. The area of the second cross section is smaller than the area of the square inscribed in the circle of diameter of the first cross section.

10 Claims, 6 Drawing Sheets

(56) References Cited

U.S. PATENT DOCUMENTS

| | | | |
|---|---|---|---|
| 3,727,902 | A | 4/1973 | Burckhardt et al. |
| 4,111,407 | A | 9/1978 | Stager |
| 4,424,695 | A | 1/1984 | Kirchhoff et al. |
| 4,753,423 | A | 6/1988 | Ukai et al. |
| 4,763,882 | A | 8/1988 | Nishiyama et al. |
| 4,869,471 | A | 9/1989 | Schwarz et al. |
| 4,886,256 | A | 12/1989 | Nishiyama et al. |
| 5,310,167 | A | 5/1994 | Noll |
| 6,193,225 | B1 | 2/2001 | Watanabe |
| 6,698,780 | B2 | 3/2004 | Miyoshi |
| 10,065,471 | B2 | 9/2018 | Nishizawa |
| 10,144,261 | B2 | 12/2018 | Nishizawa |
| 10,155,425 | B2 | 12/2018 | Nishizawa |
| 11,371,575 | B1 * | 6/2022 | Nishizawa ............... F16F 1/043 |
| 2020/0208702 | A1 | 7/2020 | Ono et al. |
| 2022/0178415 | A1 | 6/2022 | Nishizawa et al. |

FOREIGN PATENT DOCUMENTS

| | | |
|---|---|---|
| DE | 102014102061 A1 | 8/2015 |
| JP | S151179 Y1 | 2/1940 |
| JP | S51129554 A | 11/1976 |
| JP | S52131556 U | 10/1977 |
| JP | S5452257 A | 4/1979 |
| JP | S5534520 U | 3/1980 |
| JP | S56141431 A | 11/1981 |
| JP | S5711743 A | 1/1982 |
| JP | S5855372 A | 4/1983 |
| JP | S5855372 B2 | 12/1983 |
| JP | S62155342 A | 7/1987 |
| JP | 2000337415 | 12/2000 |
| JP | 2003206968 A | 7/2003 |
| WO | 2022123960 A1 | 6/2022 |
| WO | 2022260180 A1 | 12/2022 |

OTHER PUBLICATIONS

Notice of Allowance dated Mar. 2, 2022, issued in related U.S. Appl. No. 17/113,438.
Office Action (Non-Final Rejection) dated Oct. 8, 2021, issued in related U.S. Appl. No. 17/113,438.
International Search Report and Written Opinion dated Jan. 18, 2022, issued in International Application No. PCT/ JP2021/040372.
Related U.S. Appl. No. 17/113,438; First Named Inventor: Shinichi Nishizawa; Title: "Coil Spring"; Filed: Dec. 7, 2020.
Related U.S. Appl. No. 17/703,295; First Named Inventor: Shinichi Nishizawa; Title: "Coil Spring"; Filed: Mar. 24, 2022.
International Search Report (ISR) and Written Opinion dated Apr. 4, 2023, issued in International Application No. PCT/JP2023/008340 (which is a counterpart of related U.S. Appl. No. 17/703,295).
International Search Report (ISR) and Written Opinion dated Aug. 1, 2023, issued in International Application No. PCT/JP2023/020333.

* cited by examiner

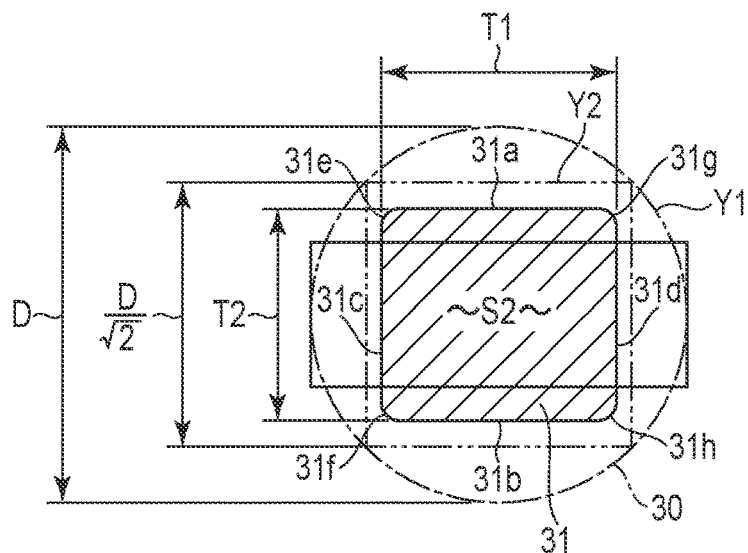
F I G. 4
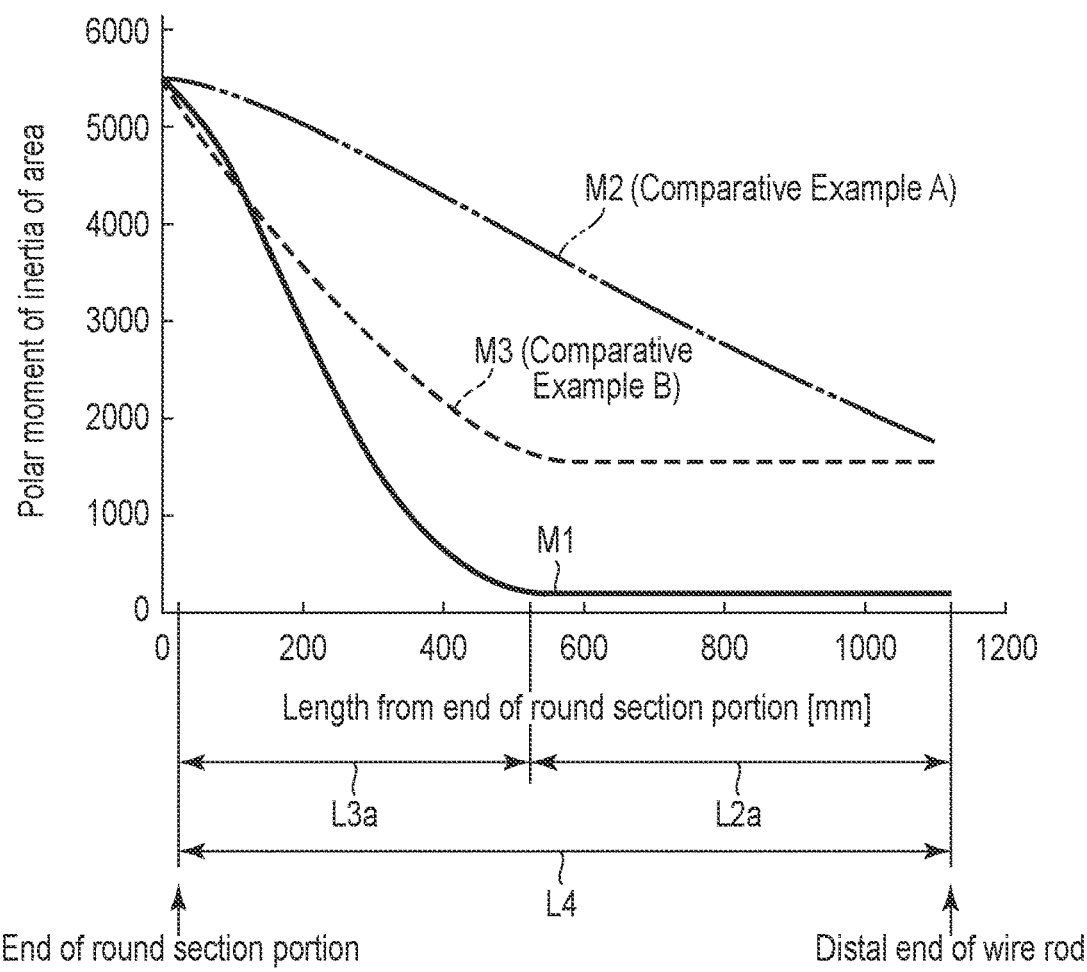
F I G. 5

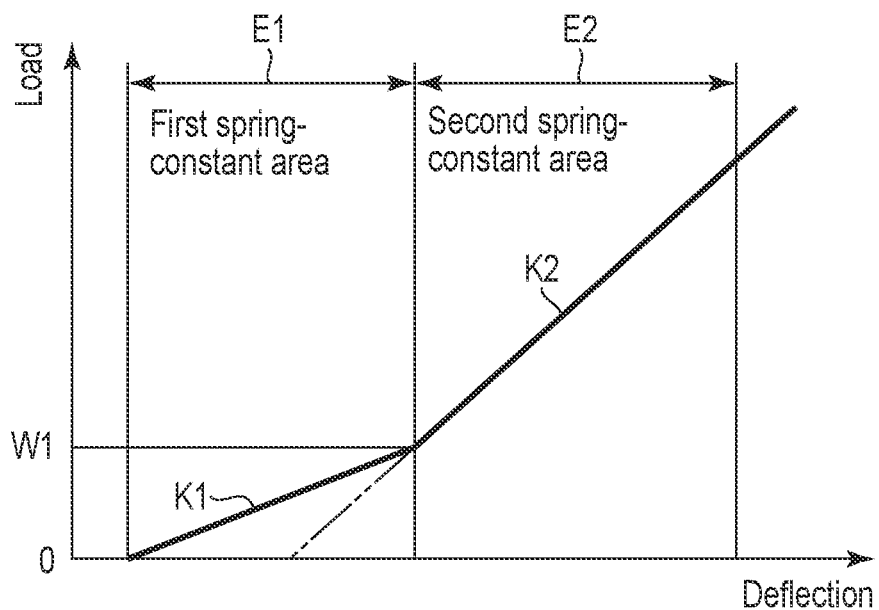
F I G. 6
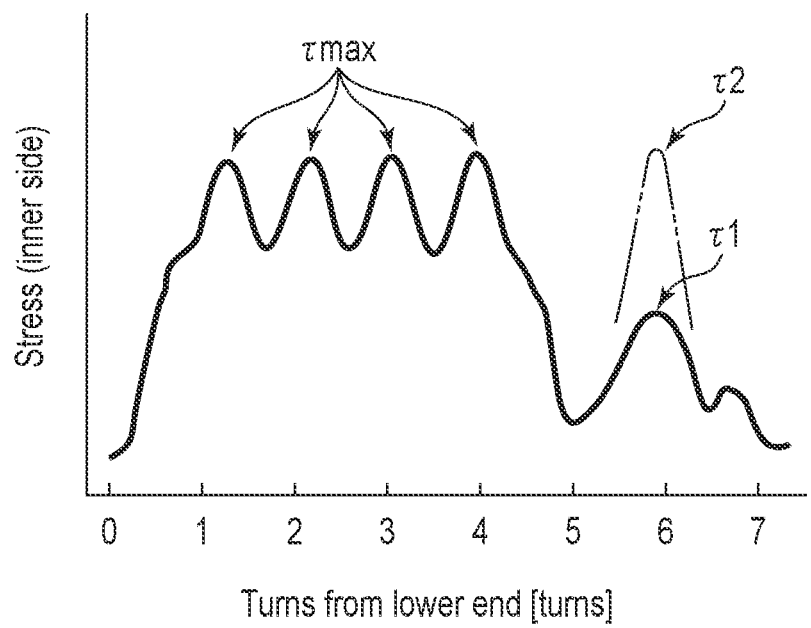
F I G. 7

COIL SPRING

BACKGROUND OF THE INVENTION

1. Field of the Invention

The present invention relates to a coil spring used, for example, in a vehicle suspension system or the like.

2. Description of the Related Art

An example of coil springs used in vehicle suspension devices comprises a helically-wound wire rod. In general, the cross-section of the wire rod of a coil spring (the cross-section perpendicular to the longitudinal direction of the wire rod) is round. The coil spring includes a first end turn part in contact with a first spring seat of the suspension device, a second end turn part in contacts with a second spring seat and an effective spring part between the first end turn part and the second end turn part. The effective spring part includes a plurality of coil portions. When the coil spring is compressed to a predetermined length by a load, a gap exists between the coil portions of the effective spring part. The end turn parts are in contact with the respective spring seats at all times regardless of the magnitude of the load. A part of the effective spring part is in contact with or detached away from the spring seat depending on the magnitude of the load.

The coil spring expands and contracts at a predetermined stroke between assumed minimum and maximum loads. In some vehicles, coil springs with nonlinear characteristics may be desired. Coil springs with nonlinear characteristics have a spring constant which varies in accordance with the magnitude of the load. For example, when the load is small, the coil spring deflects at a first spring constant, and when the load is large, the coil spring deflects at a second spring constant. The second spring constant is greater than the first spring constant. Tapered coil springs are also known, which include a tapered portion where the diameter of the wire rod decreases from a middle portion of the effective spring part to an end of the wire rod. In the tapered coil spring, the rigidity of the tapered portion is low, and therefore, mainly the tapered portion deflects in a range of small loads. When the load increases, the tapered portions are brought into tight contact with each other, and mainly the effective spring part deflects. As a result, nonlinear characteristics are obtained.

In the tapered coil springs described in JP S57-11743 A and U.S. Pat. No. 4,111,407, the diameter of the wire rod decreases from the middle portion of the effective spring part to the end turn part. In the tapered coil spring discussed in JP S56-141431 A, the cross sections of the wire rod in the tapered portion and the end turn part have rounded octagonal shapes close to circles. In coil springs formed of a wire red having a substantially a round section portion, it is not easy to form a portion of a wire rod with an extremely small diameter. In order to make a wire rod having a sufficiently small diameter, for example, by plastic forming, it is necessary to use a special type of rolling roll. It is possible to reduce the wire diameter by cutting or swaging, but the high processing cost and long processing time are required, and therefore these processing methods are not suitable for practical use. Due to these circumstances, it has been difficult to reduce the wire diameter of a part of the wire rods to an extremely small level.

Even if there is a limit to reducing the diameter of a wire rod of a tapered portion and a small section portion (a small diameter section) in a coil spring with nonlinear characteristics, it is still possible to reduce the spring constant in a small load range by increasing the number of turns of the tapered portion and the small section portion. The tapered portion and the small section portion of a coil spring with nonlinear characteristics are brought into tight contact with each other when the load is large. Therefore, the tapered portion and the small section portion of the coil spring, which are in tight contact with each other become a dead coil portion which does not function as a spring. Coil springs with a large number of dead coil portions cause the weight of the vehicle to increase.

In the coil springs described in JP 2000-337415 A and JP S54-52257 A, a portion of the wire rod along the length direction (a portion including the end turn parts) is rolled to form a flat portion with a flat cross section-. The flat portion can be formed using an ordinary rolling roll. However, the flat portion has a much greater polar moment of inertia of area compared to a wire rod with a round section portion. For this reason, it is difficult to reduce the weight of coil springs with nonlinear characteristics, which include flat portions, even if the desired nonlinear characteristics can be obtained.

BRIEF SUMMARY OF THE INVENTION

An object of the present invention is to provide a light-weighted coil spring with nonlinear characteristics.

According to one embodiment of the invention, there is provided a coil spring comprising a wire rod with a first end and a second end, and including a first end turn part including the first end of the wire rod, a second end turn part including the second end of the wire rod, and an effective spring part. The effective spring part includes a plurality of coil portions formed between the first end turn part and the second end turn part and respective gaps between coil portions adjacent to each other.

The wire rod of the embodiment comprises a round section portion including a round first cross section perpendicular to a longitudinal direction of the wire rod, a quadrangle section portion including a quadrangle second section perpendicular to the longitudinal direction and a variable section portion.

The quadrangle section portion includes at least a first coil portion and a second coil portion, a width and a thickness of the second section each being less than a diameter of the first section, and an area of the second section is less than an area of a square inscribed in a circle of the diameter of the first section. The variable section portion is formed between the round section portion and the quadrangle section portion of the wire rod, a cross section thereof perpendicular to the longitudinal direction varies from circular to quadrangle and an area of the cross-section decreases, from the round section portion to the quadrangle section portion.

The quadrangle cross section can be processed relatively easily using a rolling roll or the like. The processing of reducing the cross-sectional area of the quadrangle cross-sectional portion is easier than processing of reducing the cross-sectional area of the round cross-sectional portion.

The quadrangle section portion may include a first plane and a second plane along a radial direction of the coil spring, and a third plane and a fourth plane along a central axis of the coil spring. The coil spring may comprise a contact portion where the first coil portion and the second coil portion are brought into contact with each other when the coil spring is compressed.

The variable section portion may include a first surface continuous to the first plane, a second surface continuous to the second plane, a third surface continuous to the third plane, a fourth surface continuous to the fourth plane, a first arc portion between the first surface and the third surface, a second arc portion between the second surface and the third surface, a third arc portion between the first surface and the fourth surface, and a fourth arc portion between the second surface and the fourth surface.

The width and the thickness of the second cross section may be different from each other. The width of the second cross section may be greater than the thickness. The width and the thickness of the second cross section may be equal to each other. The width and the thickness of the first cross section may each be less than a length of one side of the square inscribed in the circle of the diameter of the first cross section. The width and the thickness of the second cross section may each be less than or equal to a ½ of square root ($1/\sqrt{2}$) of the diameter of the first cross section. The quadrangle section portion may include at least 2.0 turns and a length exceeding that from the first end to the first end turn part. The variable section portion may include at least 1.0 turn.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a cross-sectional view schematically showing an example of a quadrangle section portion of the wire rod.

FIG. 5 is a diagram showing a polar moment of inertia of area of each of three types of wire rods with different cross-sections.

FIG. 6 is a diagram schematically showing spring characteristics (a relationship between deflection and load) of the coil spring shown in FIG. 1.

FIG. 7 is a diagram showing a relationship between a position from a lower end (turns from the lower end) and stress (inner side of coil) of the coil spring.

DETAILED DESCRIPTION OF THE INVENTION

A coil spring according to the first embodiment of the present invention will now be described with reference to FIGS. 1 to 9.

Figure 1:
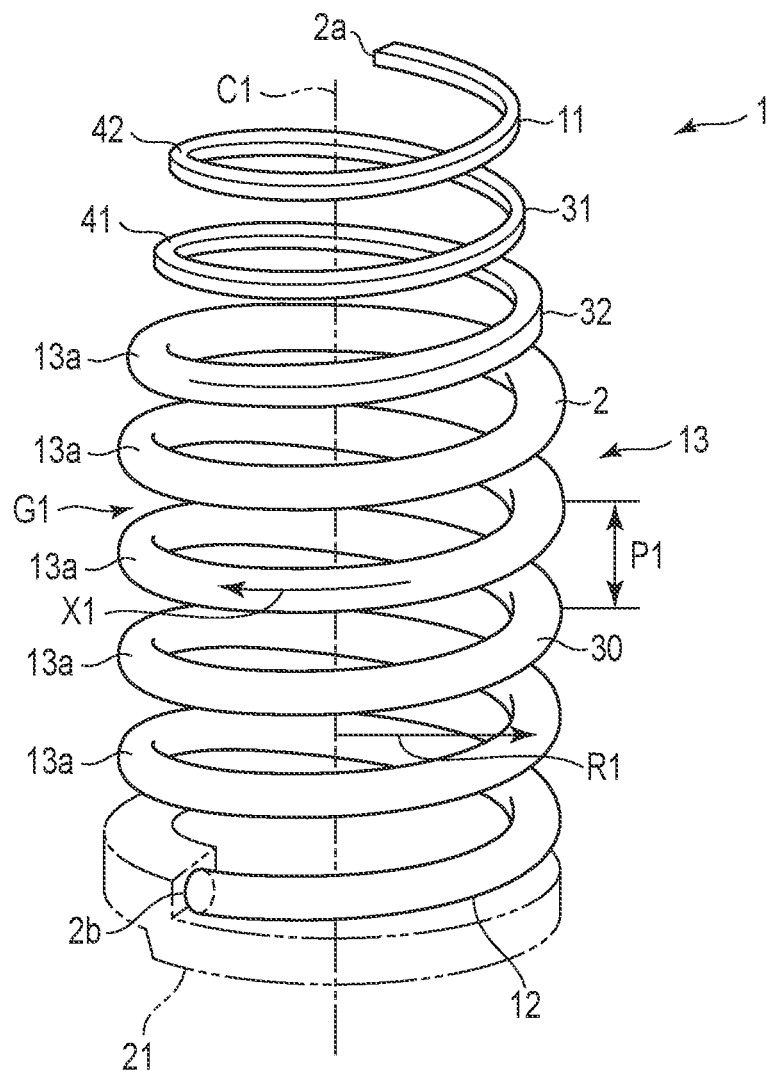
FIG. 1 is a perspective view of a coil spring according to the first embodiment.

FIG. 1 shows a coil spring 1 used in a suspension device of a vehicle such as an automobile. The coil spring 1 includes a wire rod 2 wound in a spiral shape. The wire rod 2 is made of spring steel, for example, and has a first end 2a and a second end 2b. The coil spring 1 has a first end turn part 11 including the first end 2a of the wire rod 2, a second end turn part 12 including the second end 2b and an effective spring part 13.

The effective spring part 13 is formed between the first end turn part 11 and the second end turn part 12 and includes a plurality of coil portions 13a. When the coil spring 1 is assembled into a vehicle suspension system, the first end turn part 11 including the first end 2a is located on an upper side and the second end turn part 12 including the second end 2b is located on a lower side. In this case, a central axis C1 of the coil spring 1 extends along up and down directions. The direction perpendicular to the central axis C1 (indicated in FIG. 2 with an arrow C2 pointing both directions) is a radial direction of the coil spring 1.

For example, the effective spring part 13 has a cylindrical shape with a constant pitch P1 (shown in FIG. 1) and a coil diameter R1 which is substantially constant. Here, the expression "substantially constant" is meant such a degree that the variation is within the tolerance range of the coil spring manufactured by the coiling machine, or the variation in the tolerance range due to springback is negligible in practical use. Note that such a non-cylindrical coil spring may as well do that the pitch P1 and the coil diameter R1 vary in a direction along the central axis C1.

The first end turn part 11 is supported by a spring seat 20 (shown in FIG. 2) on an upper side of the suspension system. The second end turn part 12 is supported by a lower spring seat 21 (shown in FIG. 1) on a lower side of the suspension system. The coil spring 1 is compressed between the upper spring seat 20 and the lower spring seat 21. While the coil spring 1 is compressed in a predetermined load range (the range of load used as a suspension system), the effective spring part 13 has a gap G1 between each adjacent pair of coil portions 13a.

The coil spring 1 employed in a vehicle suspension system is used in a load range between assumed minimum and maximum loads. In the effective spring part 13, adjacent coil portions 13a are not brought into contact with each other between a full bump state where the spring is compressed at maximum and a full rebound state where it is expanded at maximum, and therefore, functions effectively as a spring.

Figure 2:
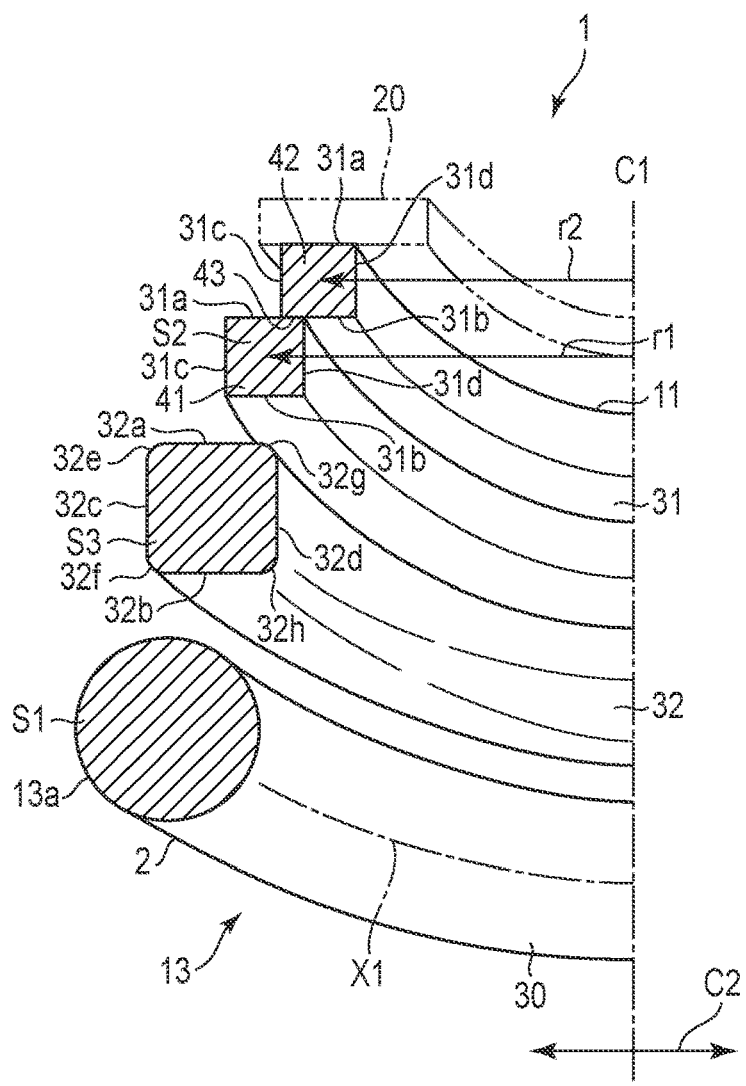
FIG. 2 is a perspective view of a portion of the coil spring shown in FIG. 1, including cross sections of the coil spring in a compressed state.

FIG. 2 is a perspective view of the coil spring 1, including cross sections of parts of the coil spring 1 (near the end turn parts 11) in a compressed state. The coil spring 1 of this embodiment includes a round section portion 30, a quadrangle section portion 31, and a variable section portion 32. The variable section portion 32 is formed between the round section portion 30 and the quadrangle section portion 31. The first end turn part 11 includes the quadrangle section portion 31 and is formed into a spiral shape. The second end turn part portion 12 includes a part of the round section portion 30 and is formed into a spiral shape. The effective spring part 13 comprises the round section portion 30 and a plurality of coil portions 13a formed into a spiral shape.

Figure 3:
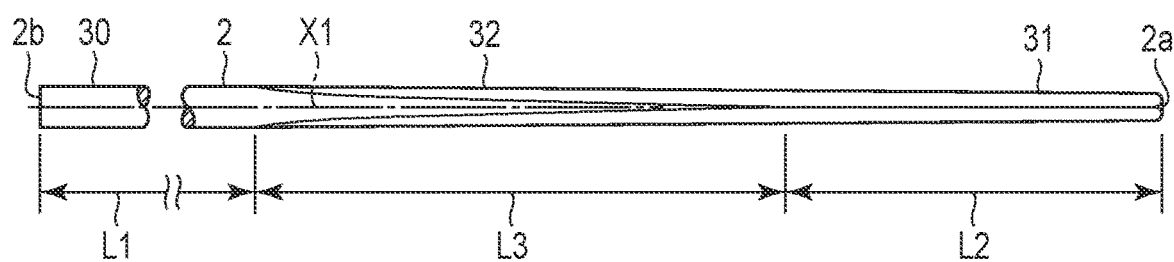
FIG. 3 is a side view of a portion of a wire rod of the coil spring before coiling.

FIG. 3 shows a part of the wire rod 2 before it is coiled. An axis X1 passing through the center of wire rod 2 extends in the length direction of the wire rod 2. The wire rod 2 shown in FIG. 3 includes a round section portion 30 having a length L1, a quadrangle section portion 31 having a length L2, and a variable section portion 32 having a length L3.

The round section portion 30 has the length L1 necessary for the multiple coil portions 13a of the effective spring part 13. The quadrangle section portion 31 is formed over the length L2 from the first end 2a of the wire rod 2. The length L2 is equivalent to two or more turns of the coil spring 1 formed in a spiral shape. The variable section portion 32 is formed between the round section portion 30 and the quadrangle section portion 31 over the length L3. The quadrangle section portion 31 has the length L2 from the first end 2a over the first end turn part 11 and includes at least a first coil portion 41 and a second coil portion 42.

As shown in FIG. 2, the round section portion 30 includes a first cross-section S1 perpendicular to the axis X1 of the wire rod 2. The first cross-section S1 is circular. The first cross-section S1 is substantially constant in the length direction (along the axis X1) of the wire rod 2. The second end turn part 12 is a part of the round section portion 30, and therefore the cross-section of the wire rod 2 is circular. The diameter of the wire rod in the second end turn part 12 (the diameter of the cross-section of the wire rod 2) is the same as the diameter of the wire rod in the effective spring part 13.

The quadrangle section portion 31 includes a quadrangle second cross section S2 perpendicular to the axis X1 of the wire rod 2. The quadrangle section portion 31 includes a first plane 31a on an upper side, a second plane 31b on a lower side, a third plane 31c on an outer side and a fourth plane 31d on an inner side. The first plane 31a and the second plane 31b are each arranged along the radial direction of the coil spring 1(, indicated by arrows C2 in both directions in FIG. 2). The third plane 31c and the fourth plane 31d are each along the central axis C1 of the coil spring 1.

FIG. 2 shows the state of the coil spring 1 compressed by the load along the central axis C1. The quadrangle section portion 31 has a first coil portion 41 and a second coil portion 42. The coil diameter r2 of the second coil portion 42 is smaller than or the same as the coil diameter r1 of the first coil portion 41. When the coil spring 1 is compressed, the first plane 31a of the first coil portion 41 and the second plane 31b of the second coil portion 42 are overlaid on each other in a direction along the central axis 1C of the coil spring 1. Thus, a contact portion 43 is formed where the first coil portion 41 and the second coil portion 42 are brought into contact with each other along the thickness direction. With this structure, it is possible to avoid the second coil portion 42 from entering (slipping into) an inner side of the first coil portion 41.

FIG. 4 shows a cross-sectional view schematically showing an example of the quadrangle section portion 31. The second cross section S2 is a quadrangle including a square or rectangle. In FIG. 4, a width of each of the first plane 31a and the second plane 31b is represented by T1. A thicknesses of each of the third plane 31c and the fourth plane 31d is represented by T2. The cross-section of the quadrangle section portion 31 (the second cross section S2) is substantially constant in the length direction of the wire rod 2 (along the axis X1).

As shown in FIG. 4, the width T1 and the thickness T2 of the second cross-section S2 are each less than a diameter D of the first cross section S1. The area of the second cross section S2 is represented as the product of T1 and T2, that is, (T1·T2). A one-dotted chain line provided in FIG. 4 represents a circle Y1 having a diameter D. The circle Y1 corresponds to a contour of an outer circumferential surface of the wire rod 2. A two-dotted chain line in FIG. 4 represents a right square Y2 inscribed in the circle Y1. The cross-sectional area of the quadrangle section portion 31, that is, the area of the second cross section S2, is smaller than the area of the square Y2 inscribed in the circle Y1. In other words, there are relationships of T1<D, T2<D, and T1·T2<D²/2.

The width T1 of the cross section of the quadrangle section portion 31 may be greater than the thickness T2. In this case, the contact area of the contact portion 43 can be made larger as compared to the cross section of the square. When the width T1 is greater than the thickness T2, the rigidity of the coil along its radial direction (indicated in FIG. 2 by the arrow C2) can be increased compared to the end turn part made of a wire rod having a round section portion. Here, note that the width T1 and thickness T2 may be the same as each other. The width T1 and the thickness T2 each should preferably be less than or equal to a ½ of square root (1/√2) of the diameter D of the first cross section.

The angle between the first plane 31a and the third plane 31c may be, for example, 90°. The angle between the first plane 31a and the fourth plane 31d is, for example, 90°. The angle between the second plane 31b and the third plane 31c is, for example, 90°. The angle between the second plane 31b and the fourth plane 31d is, for example, 90°.

Between the first plane 31a and the third plane 31c, a rounded first corner portion 31e may be formed. Between the second plane 31b and the third plane 31c, a rounded second corner portion 31f may be formed. Between the first plane 31a and the fourth plane 31d, a rounded third corner portion 31g may be formed. Between the second plane 31b and the fourth plane 31d, a rounded fourth corner portion 31h may be formed.

The cross-section of the variable section portion 32 (the third cross-sectional section S3 perpendicular to the axis X1) gradually changes from circular to quadrangle and decreases its cross-sectional area from the round section portion 30 to the quadrangle section portion 31. The variable section portion 32 is formed between the round section portion 30 and the quadrangle section portion 31 by 1.0 turn or more.

As shown in FIG. 2, the cross-section (the third cross section S3) of the variable section portion 32 includes a first surface 32a, a second surface 32b, a third surface 32c and a fourth surface 32d. Between the first surface 32a and the third surface 32c, a first arc portion 32e is formed. A second arc portion 32f is formed between the second surface 32b and the third surface 32c. A third arc portion 32g is formed between the first surface 32a and the fourth surface 32d. A fourth arc portion 32h is formed between the second surface 32b and the fourth surface 32d.

The first surface 32a is continuous to the first plane 31a of the quadrangle section portion 31. The second surface 32b is continuous to the second plane 31b. The third surface 32c is continuous to the third plane 31c. The fourth surface 32d is continuous to the fourth plane 31d. The first surface 32a and the second surface 32b are arranged along the radial direction of the coil spring 1 (indicated by arrow C2 in both directions in FIG. 2). The third surface 32c and the fourth surface 32d are arranged along the central axis C1 of the coil spring 1.

The first arcuate portion 32e is continuous to the first corner portion 31e of the quadrangle section portion 31 (shown in FIG. 4). The second arc section 32f is continuous to the second corner section 31f of the quadrangle section portion 31. The third arc portion 32g is continuous to the third corner portion 31g of the quadrangle section portion 31. The fourth arc portion 32h is continuous to the fourth corner portion 31h of the quadrangle section portion 31.

FIG. 5 is a diagram showing the relationship between the longitudinal position and the polar moment of inertia of area (torsional rigidity) for three types of wire rods whose cross-sections are different from each other. A solid line M1 in FIG. 5 represents the polar moment of inertia of area of the wire rod 2 having a quadrangle section portion 31. The wire rod diameter of the round section portion 30 is 15.4 mm, and each of the width T1 and the thickness T2 of the quadrangle section portion 31 is about 6 mm. In FIG. 5, the horizontal axis from zero (0) to the length L3a indicates the polar moment of inertia of area of the variable section portion 32, and the length L2a indicates the polar moment of inertia of area of the quadrangle section portion 31. The polar moment of inertia of area of the quadrangle section portion 31 is sufficiently small compared to the polar moment of inertia of area of the round section portion 30.

A two-pointed line M2 in FIG. 5 indicates the polar moment of inertia of area of a wire rod of Comparative Example A, which includes a flat taper portion. The wire rod in Comparative Example A has a wire rod diameter of 15.4 mm in the round section portion. Over a length L, from an end of the round section portion to the distal end of the wire rod, the flat taper portion is formed. The cross-section of the flat tapered section (the cross-section perpendicular to the wire rod along the length direction) is a flat rectangle. The width of the end surface of the flat tapered portion is 15.4 mm or greater and the thickness thereof is 5.5 mm.

The polar moment of inertia of area (two-point chain line M2) of Comparative Example A, which includes a flat tapered section is much greater than the polar moment of inertia of area (solid line M1) of the wire rod 2 including the quadrangle section portion 31. In the case of the coil spring made of the wire rod of Comparative Example A, it is necessary to increase the number of turns in the flat tapered portion to reduce the first spring constant when the spring deflects in the small load range. Therefore, when the coil spring of Comparative Example A deflects at the second spring constant (large load range), the number of coil portions of the dead coil portion which does not function as a spring increases, and the weight thereof increases accordingly.

A dashed line M3 in FIG. 5 indicates the polar moment of inertia of area of a wire rod in Comparative Example B, which includes a round taper portion. The wire rod of Comparative Example B includes a round taper portion having a length L3a from the end of the round section portion and a small section portion having a length L2a (a wire rod diameter of 11.4 mm). The wire rod diameter of the round section portion is 15.4 mm. The polar moment of inertia of area (the dashed line M3) of Comparative Example B is greater than the polar moment of inertia of area (the solid line M1) of the wire rod 2 including a quadrangle section portion 31. In the case of the coil spring made of the wire rod of Comparative Example B, it is necessary to increase the number of turns in the round tapered portion in order to reduce the first spring constant when the spring deflects in the small load range. Therefore, when the spring deflects at the second spring constant (large load range), the number of turns in the dead coil portion part, which does not function as a spring, increases, and the weight thereof increases accordingly. Moreover, it is not easy to form a round tapered section by processing a wire rod with a round cross section. In contrast, the quadrangle section portion 31 can be processed relatively easily using at least one pair of rolling rolls.

FIG. 6 is a diagram schematically showing spring characteristics (a relationship between the load and deflection) of the coil spring 1 including the quadrangle section portion 31. In FIG. 6, the horizontal axis indicates deflection and the vertical axis indicates the load. The coil spring 1 is compressed between the spring seat 21 (shown in FIG. 1) on an lower side and the spring seat 20 (shown in FIG. 2) on an upper side. Between the load is zero and W1, the quadrangle section portion 31 mainly deflects. Therefore, as shown by line K1 in FIG. 6, it results in a first spring constant region E1 with a relatively small spring constant. When the load exceeds W1, the quadrangle section portion 31 is in a state of tight contact and mainly the round section portion 30 deflects. Therefore, as shown by line K2 in FIG. 6, the spring constant increases (a second spring constant range E2).

FIG. 7 shows the relationship between the stress generated on an inner side of the wire rod when the coil spring 1 is compressed and the position from the lower end of the wire rod 2 (turns from the lower end). A peak $\tau$max of stress is generated in each of the coil portions 13a of the effective spring part 13. These peaks $\tau$max are smaller than the stress tolerable in the suspension system. A small peak $\tau$1 occurs near the end turn parts 11. The inventor has made a careful study and found that when the number of coil portions of the variable section portion 32 is less than 1.0, as indicated by $\tau$2 in FIG. 7, the stress in the variable section portion 32 exceeds the peak $\tau$max of the stress in the effective spring part 13, as indicated by $\tau$2 in FIG. 7. It is undesirable for the stress in the variable section portion 32 to exceed the stress in the effective spring part 13. Therefore, in this study, the number of coil portions of the variable section portion 32 was set to 1.0 or more.

Figure 8:
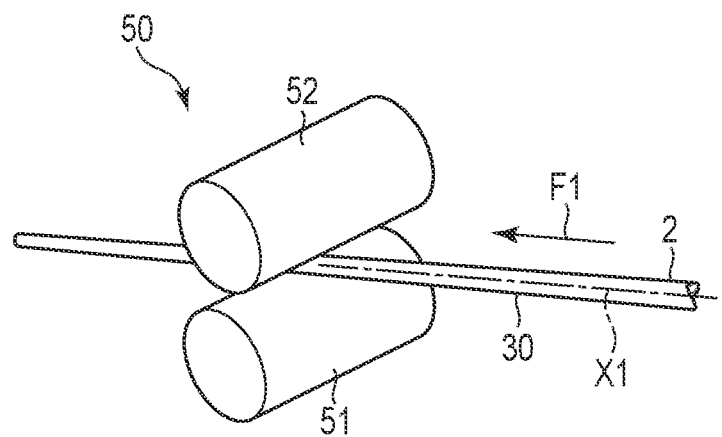
FIG. 8 is a perspective view schematically showing a rolling machine.

FIG. 8 schematically shows an example of a rolling apparatus 50 for forming a quadrangle section portion 31 and a variable section portion 32. The wire rod 2 having a round cross section moves in the direction indicated by arrow F1. The rolling apparatus 50 includes rolling rolls 51 and 52. The distance between the rolling rolls 51, 52 can be adjusted. The wire rod 2 is rolled as the wire rod 2 passes through the rolling rolls 51 and 52. The wire rod 2 is then rotated 90° around the axis X1, and the wire rod 2 is rolled again by the rolling rolls 51 and 52.

Figure 9:
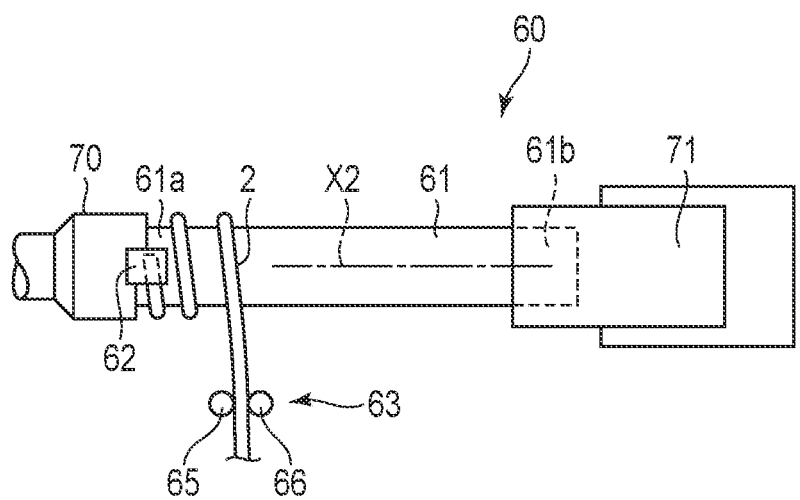
FIG. 9 is a plan view of a portion of the coiling machine.

FIG. 9 shows a part of a coiling machine 60 which forms coil springs by hot rolling (for example, at an A3 transformation point or higher but 1150° C. or less). The coiling machine 60 includes a cylindrical mandrel 61, a chuck 62 and a guide portion 63. The guide portion 63 includes a pair of first guide rolls 65 and 66.

The wire rod 2, made of spring steel, is pre-cut to a length equivalent to one coil spring. The wire rod 2 is heated to an austenitization temperature (at an A3 transformation point or higher but 1150° C. or less) and fed by a feeding mechanism to the mandrel 61. The chuck 62 secures the distal end of the wire rod 2 to the mandrel 61. The guide portion 63 guides the wire rod 2 to control the position thereof as it is wound onto the mandrel 61. One end portion 61a of the mandrel 61 is held by the chuck 62 to a drive head 70. The mandrel 61 is rotated around an axis X2 of the mandrel 61 by the drive head 70. The other end 61b of the mandrel 61 is rotatably supported by a mandrel holder 71. The guide portion 63 moves along the axis X2 of the mandrel 61 and guides the wire rods 2 according to the pitch angle of the coil spring to be formed.

The wire rod 2 has a length equivalent to one coil spring. Before the wire rod 2 is fed to the mandrel. 61, the wire rod 2 is heated by a furnace. The distal end of the heated wire rod 2 is fixed to the mandrel 61 by the chuck 62. As the mandrel 61 rotates, and in synchronization with the rotation of mandrel 61, the guide portion 63 moves in a direction along the axis X2 of the mandrel 61. As a result, the wire rods 2 are wound onto the mandrel 61 at a predetermined pitch.

Comparative Examples 1, 2, 3 and 4, provide below, are each directed to a coil spring with nonlinear characteristics, including an effective spring part including a round section portion, a round tapered portion and a small section portion. By contrast, Examples 1, 2, 3 and 4 are each directed to a coil spring with nonlinear characteristics, similar to the coil spring 1 shown in FIG. 1, including a round section portion 30, a quadrangle section portion 31 and a variable section portion 32.

Comparative Example 1

The coil spring of Comparative Example 1 has a wire rod diameter of 18 mm in the round section portion part, a wire rod diameter of 13 mm in the small section portion, a total number of coils of 8.5, and a weight of 7.0 kg.

Example 1

The coil, spring of Example 1 has a wire rod diameter of 18 mm in the round section portion 30, a width and a thickness of the cross section (the second cross section) of the quadrangle section portion 31 of about 7 mm in each and a total number of coils of 8.5. The spring characteristics (the relationship between the load and deflection) of Example 1 are similar to those of Comparative Example 1. The weight of the coil spring of Example 1 is 5.2 kg, which is about 24% lighter than that of the coil spring of Comparative Example 1.

Comparative Example 2

The coil spring of Comparative Example 2 has a wire rod diameter of 15 mm in the round section portion, a wire rod diameter of 11 mm in the small section portion, a total number of coils of 8.5, and a weight of 7.0 kg.

Example 2

The coil spring of Example 2 has a wire rod diameter of 15 mm in the round section portion 30, a width and a thickness of the cross section (the second cross section) of the quadrangle section portion 31 of about 7 mm in each and a total number of coils of 9.0. The spring characteristics of Example 2 are similar to those of Comparative Example 2. The weight of the coil spring of Example 2 is 4.0 kg, which is about 23% lighter than that of the coil spring of Comparative Example 2.

Comparison Example 3

The coil spring of Comparative Example 3 has a wire rod diameter of 22 mm in the round section portion, a wire rod diameter of 17 mm in the small section portion, a total number of coils of 8.0, and a weight of 8.5 kg.

Example 3

The coil spring of Example 3 has a wire rod diameter of 22 mm in the round section portion 30, a width and a thickness of the cross section (the second cross section) of the quadrangle section portion 31 of about 7 mm in each and a total number of coils of 8.0. The spring characteristics of Example 3 are similar to those of Comparative Example 3. The weight of the coil spring of Example 3 is 6.5 kg, which is about 22% lighter than that of the coil spring of Comparative Example 3.

Comparative Example 4

The coil spring of Comparative Example 4 has a wire rod diameter of 16 mm in the round section portion, a wire rod diameter of 12 mm in the small section portion, a total number of coils of 10.0, and a weight of 6.0 kg.

Example 4

The coil spring of Example 4 has a wire rod diameter of 15 mm in the round section portion 30, a width and a thickness of the cross section (the second cross section) of the quadrangle section portion 31 of about 7 mm in each and a total number of coils of 9.0. The spring characteristics of Example 4 are similar to those of Comparative Example 4. The weight of the coil spring of Example 4 is 5.0 kg, which is about 18% lighter than that of the coil spring of Comparative Example 4.

The quadrangle section portion 31 can be formed by rolling rolls. However, due to shape errors which may occur during the forming process, the width and thickness of the second cross section 31 may vary were, the width and thickness of the second cross section 31 are each made less than the wire rod diameter (the diameter of the first cross section 30), and the area of the second cross section 31 is made less than the area of the square inscribed in the circle of the diameter of the first cross section S1. Thus, the weight of the spring can be reduced compared to conventional coil springs. In particular, when the width T1 and the thickness T2 of the quadrangle section portion 31 are each less than or equal to a ½ of square root ($1/\sqrt{2}$) of the diameter D of the first cross section S1, the weight reduction ratio is significant.

Figure 10:
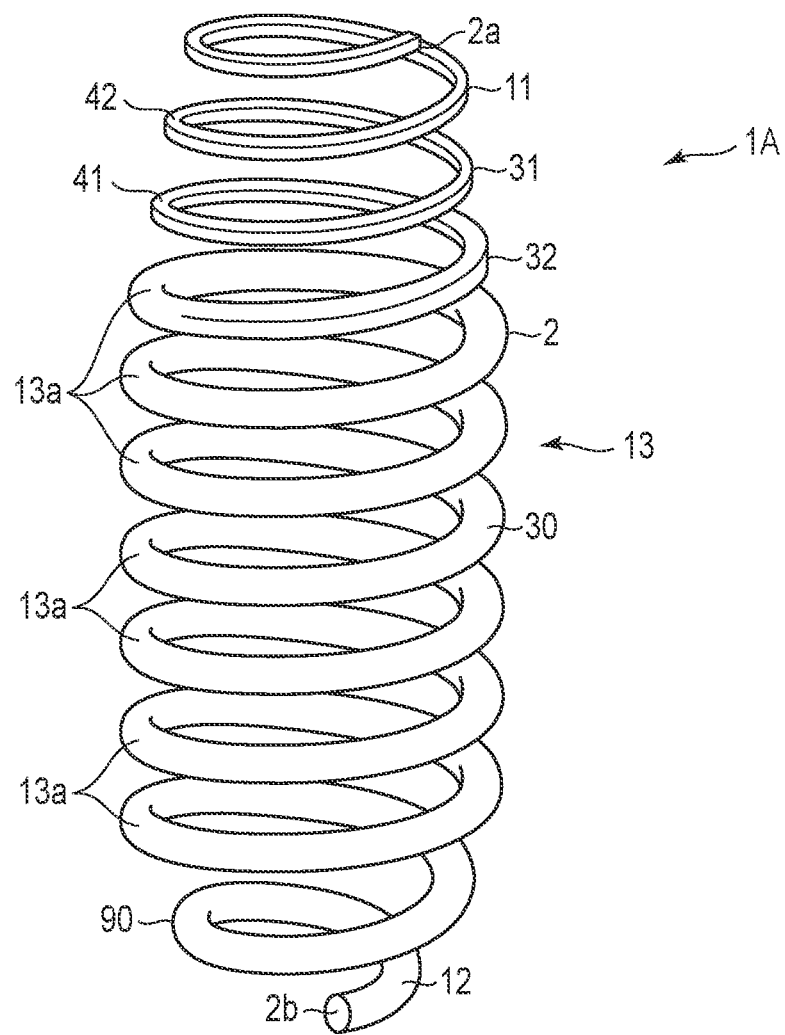
FIG. 10 is a perspective view of a coil spring according to the second embodiment.

FIG. 10 shows a coil spring 1A according to the second embodiment. The coil spring 1A includes a quadrangle section portion section 31 having two or more turns, and a variable section portion 32 having 1.0 or more turns. The cross-section of the wire rod of the second end turn part 12 is circular, and the wire rod diameter is the same as the wire rod diameter of the round section portion 30. The second end turn part 12 includes a small diameter coil portion 90 whose coil diameter decreases toward the second end 2b of the wire rod 2. The wire rod diameter of the second end turn part 12 may be less than the wire rod diameter of the round section portion 30. Since the coil spring 1A of the second embodiment has a configuration and action common with those as the coil spring 1 of the first embodiment, except for those mentioned above, the same reference symbols are attached to the common structural members, and the descriptions thereof will be omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring comprising a wire rod with a first end and a second end and including a first end turn part including the first end of the wire rod, a second end turn part including the second end of the wire rod, and an effective spring part including a plurality of coil portions formed between the first end turn part and the second end turn part, with respective gaps between coil portions adjacent to each other, the wire rod comprising:

a round section portion including a round first cross section perpendicular to a longitudinal direction of the wire rod;

a quadrangle section portion including a quadrangle second section perpendicular to the longitudinal direction, and including at least a first coil portion and a second coil portion, a width and a thickness of the second section each being less than a diameter of the first section, and an area of the second section is less than an area of a square inscribed in a circle of the diameter of the first section; and a variable section portion formed between the round section portion and the quadrangle section portion of the wire rod, a cross section thereof perpendicular to the longitudinal direction varies from circular to quadrangle and an area of the cross-section decreases, from the round section portion to the quadrangle section portion.

2. The coil spring according to claim 1, wherein the quadrangle section portion includes a first plane and a second plane along a radial direction of the coil spring, and a third plane and a fourth plane along a central axis of the coil spring.

3. The coil spring according to claim 2, wherein the coil spring comprises a contact portion where the first coil portion and the second coil portion are brought into contact with each other when the coil spring is compressed.

4. The coil spring according to claim 2, wherein the variable section portion includes a first surface continuous to the first plane, a second surface continuous to the second plane, a third surface continuous to the third plane, a fourth surface continuous to the fourth plane, a first arc portion between the first surface and the third surface, a second arc portion between the second surface and the third surface, a third arc portion between the first surface and the fourth surface, and a fourth arc portion between the second surface and the fourth surface.

5. The coil spring according to claim 1, wherein the width and the thickness of the second cross section are different from each other.

6. The coil spring according to claim 5, wherein the width of the second cross section is greater than the thickness.

7. The coil spring according to claim 1, wherein a width and a thickness of the second cross section are equal to each other.

8. The coil spring according to claim 1, wherein the width and the thickness of the first cross section are each less than a length of one side of the square inscribed in the circle of the diameter of the first cross section.

9. The coil spring according to claim 1, wherein the width and the thickness of the second cross section are each less than or equal to a ½ of square root ($1/\sqrt{2}$) of the diameter of the first cross section.

10. The coil spring according to claim 1, wherein the quadrangle section portion includes at least 2.0 turns and a length exceeding that from the first end to the first end turn part, and the variable section portion includes at least 1.0 turn.

\* \* \* \* \*